No. 632,353. Patented Sept. 5, 1899.
L. C. KOHLER.
TRAVELER FOR PIPES OR CONDUITS.
(Application filed Nov. 21, 1898.)
(No Model.) 2 Sheets—Sheet 2.
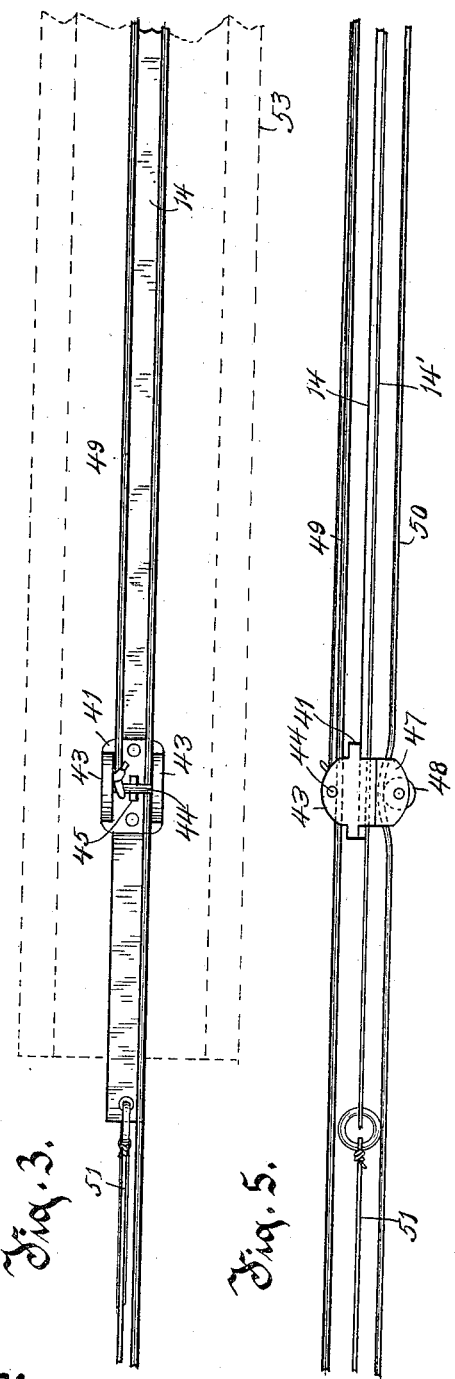
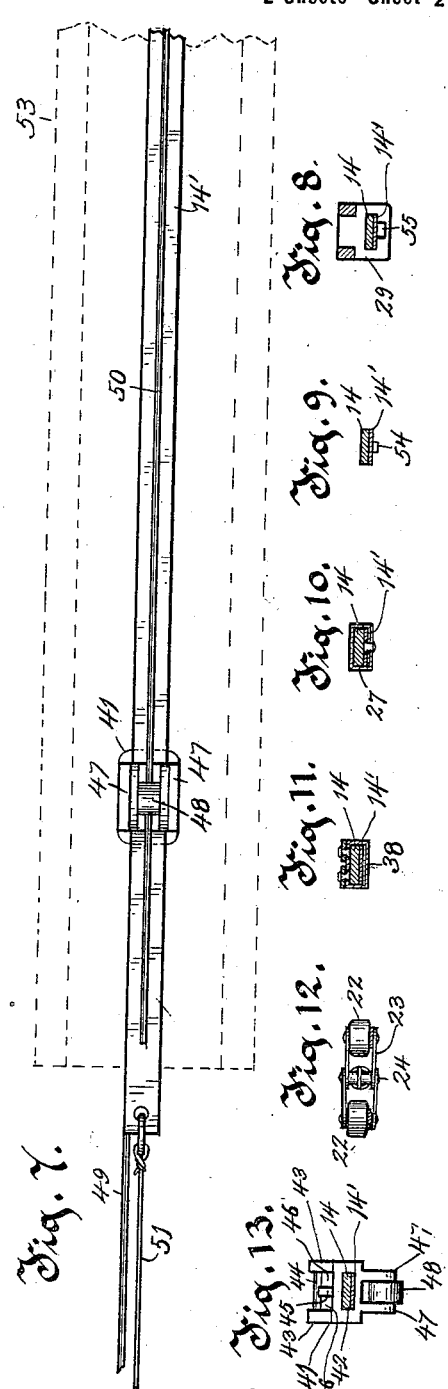
Witnesses.
Anna V. Faust.
C. H. Keeney.
Inventor.
Louis C. Kohler.
By Benedict and Morsell.
Attorneys.

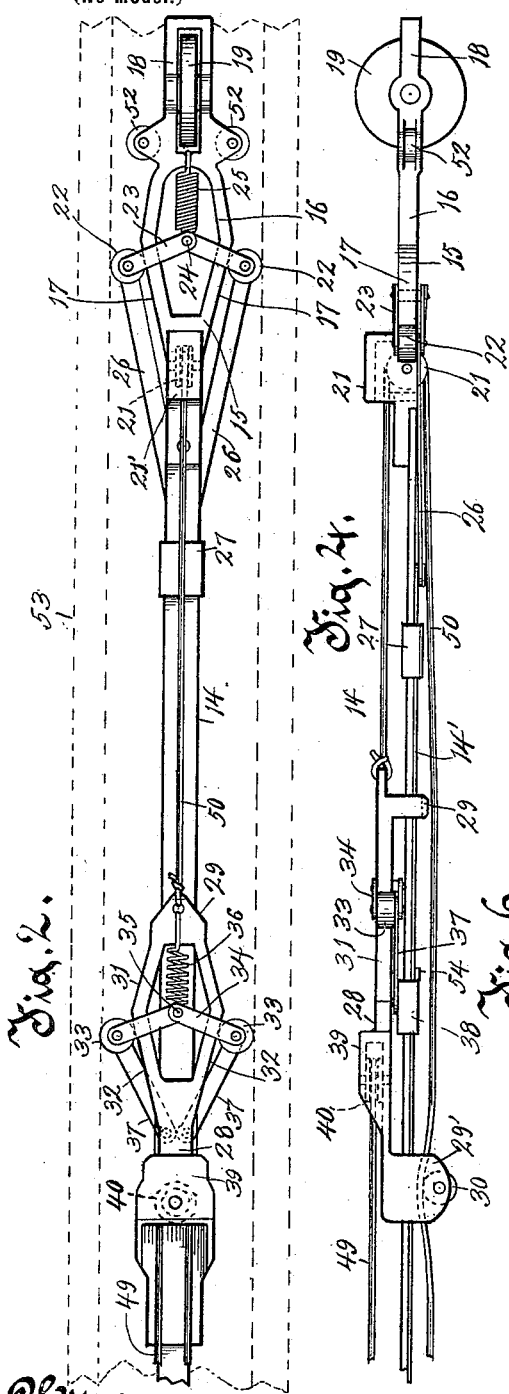

UNITED STATES PATENT OFFICE.

LOUIS C. KOHLER, OF MILWAUKEE, WISCONSIN, ASSIGNOR OF ONE-HALF TO F. C. STOVER, OF CHICAGO, ILLINOIS.

TRAVELER FOR PIPES OR CONDUITS.

SPECIFICATION forming part of Letters Patent No. 632,353, dated September 5, 1899.

Application filed November 21, 1898. Serial No. 697,021. (No model.)

*To all whom it may concern:*

Be it known that I, LOUIS C. KOHLER, of Milwaukee, in the county of Milwaukee and State of Wisconsin, have invented a new and useful Improvement in Travelers for Pipes or Conduits, of which the following is a description, reference being had to the accompanying drawings, which are a part of this specification.

My invention has relation to improvements in travelers for pipes or conduits.

The invention is especially intended as a means for carrying telegraph or telephone wires through underground pipes or conduits, the device being adapted to travel through said pipes or conduits and to draw with it a cord to which the wire may be attached or to draw with it the wire attached directly to the traveler.

The present invention is an improvement upon the form of traveler covered in the United States Letters Patent issued to me under date of March 1, 1898, No. 599,713, which patent covers a pneumatic traveler which is dependent for successful operation upon pneumatic pressure, either by producing a vacuum in front of it or by compressed air acting on it at the rear.

It is the primary object of my present invention to dispense entirely with the necessity of producing a vacuum in the pipe or conduit in front of the traveler or of the necessity of compressed air acting against the traveler at the rear, the traveler in this form of construction being adapted to travel solely by mechanical power.

With the above primary object in view the invention consists of the devices and parts or their equivalents, as hereinafter more fully set forth.

In the accompanying drawings, Figure 1 is a side elevation of the entire machine, with the exception of the head portion at the forward end thereof, which is shown as broken away. Fig. 2 is a plan view of the forward portion of the machine, showing the forward head-piece as anchored and the slide as in the act of moving forwardly. Fig. 3 is a plan view of the rear portion of the machine, being a continuation of Fig. 2. Fig. 4 is a side elevation of Fig. 2. Fig. 5 is a side elevation of Fig. 3, being a continuation of Fig. 4. Fig. 6 is an inverted plan view of the forward portion of the machine, showing the slide as anchored and the machine as in the act of moving forwardly in the pipe or conduit. Fig. 7 is an inverted plan view of the rear portion of the machine, being a continuation of Fig. 6. Fig. 8 is a cross-section on the line 8 8 of Fig. 6. Fig. 9 is a cross-section of the machine on a plane through the releasing-pin. Fig. 10 is a cross-section on the line 10 10 of Fig. 6. Fig. 11 is a cross-section on the line 11 11 of Fig. 6. Fig. 12 is a cross-section on the line 12 12 of Fig. 6; and Fig. 13 is an edge view of the rear guide, the bars being in section.

Referring to the drawings, the numerals 14 14' indicate two longitudinal bars, the under bar 14' being preferably extended at the rear end of the machine a somewhat greater distance than the upper bar 14. Both of these bars are preferably and advisably made of flexible spring metal, thereby rendering the device capable of being readily inserted into a pipe or conduit and also readily enabling the device to travel through pipes of irregular conformation, the spring material enabling the device to ascend inclines in the pipe or to descend declines or to travel around bends. To the forward extremity of the upper bar 14 is connected a head-piece 15. This head-piece is formed or provided with an intermediate yoke portion 16, the sides of said yoke forming inclined or cam surfaces 17 17. The forward extremity of the yoke is formed with a projection 18, having an elongated slot therein, in which slot is arranged a roller 19, mounted on an axial pin. The rear portion of the head-piece is also slotted, as indicated at 20, and in this slot is arranged a sheave or pulley 21. On its upper side the rear portion of the head-piece is formed with an upwardly-extending arch-shaped projection extending over the slot 20 and forming a rope-guide 21'.

Adapted to work against the inclined or cam surfaces 17 17 are rollers 22 22. These rollers are carried at the ends of the links of a toggle-joint 23. There are advisably two links to each toggle-joint section, one link of each section being above the yoke portion of the head-piece and one link of each section being below the yoke portion of the headpiece. The rollers 22 are carried between the outer ends of these links, and said outer ends of the links are extended sufficiently outwardly to enable the rollers to bear against the cam or inclined surfaces. The inner ends of these links are connected by a pivot-pin 24, and to this pivot-pin is connected one end of a coiled spring 25, the opposite end of said coiled spring being connected to the head portion. To the axial pins of the rollers 22 are connected other links 26 26, said links extending and converging rearwardly on the under side of the machine and being connected at their rear converging ends to the forward extremity of the under flexible bar 14'. A sleeve 27 is secured to the under bar 14', near the forward end of said bar, and the upper bar 14 is adapted to pass freely through this sleeve. The sleeve serves the function of assisting in holding the bars against separation.

The numeral 28 indicates a slide, said slide being formed or provided at opposite ends with downwardly-extending loops 29 29', through which loops the two bars 14 14' are adapted to pass freely. The sides of the rear loop 29' are extended downwardly, as clearly shown in the drawings, and between these downwardly-extended sides is journaled a roller 30. The slide 28 is also formed with a yoke portion 31, the sides of said yoke portion being formed with inclined or cam edges 32 32. Adapted to bear against these inclined or cam edges are rollers 33 33, said rollers carried at the outer ends of the links of a toggle-joint 34. The sections of this toggle-joint are also preferably and advisably each formed of two links, the upper links bearing against the upper side of the yoke and the lower links against the lower side of the yoke. The outer ends of these links carry the rollers 33, and said ends of the links, as in the case of the toggle-joint 23, are extended outwardly a sufficient distance to permit the rollers 33, which are journaled therebetween, to bear against the inclined or cam edges 32. The sets of links are connected together at their inner ends by a pivot-pin 35. To this pivot-pin is connected one end of a coiled spring 36, the opposite end of said coiled spring being connected to the forward end of the slide. To the axial pins of the rollers 33 are connected other links 37 37. These links are extended and converged rearwardly, and their rear converged ends are connected to a sleeve 38, which loosely surrounds the two bars 14 14'. The rear portion of the slide 28 is formed or provided on its upper side with a pulley-box 39, within which is arranged a pulley or sheave 40, mounted on a vertical axis.

Secured fast to the rear end of the upper bar 14 is a guide 41. This guide is formed with a slot 42, in which slot both the bars 14 and 14' extend. The bar 14, however, is rigidly secured in said slot, while the bar 14' passes loosely therethrough and may be extended rearwardly for a desired distance. This guide is provided with upwardly-extending side members 43 43, and a transverse pin 44 extends across and connects the side members. A short stud or lug 45 extends upwardly from the upper side of the guide to the transverse pin 44 and forms two spaces 46 46. The under side of the guide is provided with downwardly-extending ears 47 47, between which is mounted a roller 48. A rope 49 is connected at one end to the transverse pin 44 on one side of the stud or lug 45, and this rope is extended forwardly to and around the sheave 40, carried by the slide 28. It is thence extended rearwardly and through one of the spaces 46 of the guide 41. The numeral 50 indicates another rope, which is connected to the forward end of the slide 28. It is then extended forwardly into the guide 21', thence around the sheave or pulley 21, thence beneath the machine and between the downwardly-extending sides of loop 29' of slide 28, thence continued rearwardly and between the downwardly-extending ears 47 47 of the guide 41. Another rope 51 may, if desired, be connected to the rear end of the under bar 14'.

I prefer to mount in lugs extending out laterally from the forward portion or the headpiece 15 rollers 52 52, which rollers are projected out a sufficient distance to extend laterally a greater distance than the rollers carried by either of the toggle-joints when said rollers of the toggle-joints are forced inwardly on their inclined or cam surfaces. This provision of the rollers 52 is made so that said rollers, if the machine should tilt in the pipe or in case the machine is passing around a curve, will engage the sides of the pipe or conduit instead of the rollers carried by the toggle-joints when said rollers of the toggle-joints are not in their working positions.

In Figs. 2, 3, 6, and 7 I show the machine as arranged within a pipe or conduit, said pipe or conduit being shown by dotted lines and indicated by the numeral 53.

In the operation of the invention, in the first place, the rope 50 is pulled. This has the effect of causing the slide 28 to travel forwardly in the pipe or conduit. The pull on the rope 50 is continued until the slide has reached the limit of its forward travel. At the time of this forward travel of the slide the rollers 22 are at the farthest lateral point of the inclined or cam surfaces 17, as indicated in Fig. 2, and hence the head-piece 17 and the bars 14 14' are anchored or held against forward movement. The next step is to pull on the rope 49. This pull exerts a rearward strain on the slide 28, and thus thrusts the rollers 33 of said slide outwardly on the farthest points of the cam-surfaces 37 and against the sides of the pipe or conduit, so as to wedge and thereby grip and anchor the slide firmly against movement. As the slide therefore on the pulling of the rope 49 is held stationary the end of the rope 49 which is attached to the pin 44 of the guide 41, said guide being firmly attached to the bar 14, will cause the two bars 14 14' to travel forwardly and also the head-piece 15, said head-piece traveling on the roller 19 and the bars on the rollers 30 and 48. As the head-piece is moved forwardly the contact of the sides of the conduit with the rollers 22 has a tendency to throw said rollers rearwardly on the innermost points of the cam or inclined surfaces 17, thereby ungripping the rollers and preventing the same from offering any obstruction to the forward movement of the machine. After the machine has moved forwardly, as just explained, the rope 50 is again pulled. This effects a rearward strain on the head-piece 15, and consequently grips the rollers 22 to the sides of the conduit, and thereby anchors the head-piece, as previously explained, while at the same time the slide 28 is pulled forwardly to its full extent, after which the rope 49 is again manipulated, so as to force the machine forward. These operations are repeated until the machine has traveled through the pipe or conduit.

The springs 25 and 36 of the respective toggle-joints 23 and 34 effect the function of holding the rollers 22 and 33 yieldingly in engagement with the sides of the conduit. The ropes 49 and 50 are preferably of sufficient length to enable the wire to be connected thereto after the machine has completed its travel through the conduit, whereby the wire may be readily pulled through the conduit from one end by a pull on the rope at the opposite end of the conduit.

It will sometimes happen that the machine in its travel through a conduit will meet with obstructions which would necessitate the withdrawing of the machine. If no provision were provided therefor, this could not be accomplished, as the rearward pulling of the machine would cause both sets of rollers 22 and 33 to be thrown outwardly against the sides of the conduit, and hence firmly wedge the machine in the conduit. In order to guard against this, I provide releasing mechanism consisting of the bar 14', having a lug 54 extending downwardly from the under side thereof, which lug is adapted to be used in connection with the sleeve 38, which loosely surrounds the under bar 14'. In the operation of this releasing mechanism if the slide 28 is not already at the forward limit of its movement a pull is exerted on the rope 50 and said slide thereby caused to move forwardly. A pull is then exerted on the rope 51. This will cause a sliding rearward of said rod 14', and as said rod is connected at its forward end to the links 26 a pull is necessarily exerted on said links, and the rollers 22 are brought to the position shown in Fig. 6, where they bear against the innermost points of the cam-surfaces 17 and are consequently free from contact with the sides of the conduit. After this unclutching of the rollers 22 is effected the continued pull on the rope 51 will cause both bars 14 14' to be moved rearwardly while the slide 28 is still anchored, and this movement will continue until the lug 54 of the under bar 14' contacts with the sleeve 38. This will cause a rearward movement of said sleeve, and as the links 37 are connected to the sleeve said links will pull the rollers 33 rearwardly to the innermost points of the cam-surfaces 32 and thereby bring said rollers out of wedging contact with the sides of the conduit. Both sets of rollers 22 and 33 are now released, so that the continued pull on the rope 51 will pull the entire machine rearwardly out of the conduit. In order to provide for the lug 54 passing the forward guide 29 of the slide 28, said guide is provided with a downwardly-extending slot 55, which permits of the passage of the lug therethrough. Of course in pulling the machine back in the manner just described the slack in the ropes 49 and 50 should be continuously taken up in order to avoid tangling and twisting of said ropes.

While it is preferable that the machine should be employed merely for carrying the ropes through the conduit, and after the machine has completed its travel through the conduit to attach the wire to the ropes and then pull the wire through, yet, if preferred, the wire can be attached directly to the machine. In fact, if the wire is not too stiff it could be attached directly to the rear end of the under bar 14' instead of attaching the rope 51 thereto, and this wire could be used for pulling the machine rearwardly in order to operate the releasing mechanism when necessity should require the removal of the machine on account of obstructions in the pipe or conduit or for other reasons.

It is obvious that the feature of the releasing mechanism hereinbefore described can be omitted from my invention, and in such case it is not absolutely necessary to provide the longitudinal bar 14'; but in lieu thereof any form of sliding part can be provided for the connection thereto of the links 26 26, and this sliding part, therefore, instead of being the long bar 14', may, for instance, be merely a sleeve loosely surrounding the bar 14 (similar to the sleeve 38, to which the links 34 are attached) and capable of sliding on the bar, and to which sleeve the links 26 should be connected. It is obvious that such construction would effect all the functions of my machine with the exception of the releasing operation. When it is desired, however, to provide a machine with means for releasing the gripping mechanisms in order that the entire machine may be pulled backward through the pipe or conduit, I provide the long bar 14' or its equivalent and the other devices in connection therewith, substantially as described, for accomplishing the releasing function.

What I claim as my invention is—

1. In a traveler for pipes or conduits, the combination, of a longitudinal bar formed or provided at or near its forward end with wedging-surfaces, gripping devices adapted to ride on said wedging-surfaces, a member carried by the bar and adapted to travel therewith, but capable of having longitudinal movement on the bar independently of the movement of the bar, connections between said member and the gripping device, a slide mounted on the bar and capable of traveling thereon independently of the bar, said slide formed or provided with wedging-surfaces, gripping devices adapted to ride on said wedging-surfaces, a sleeve or other sliding member on the bar, connections between said sleeve and the gripping devices, means for causing the forward travel of the slide, and means for causing the forward travel of the bar.

2. In a traveler for pipes or conduits, the combination of longitudinal bars adapted to travel in a pipe or conduit, one of said bars formed or provided at or near its forward end with wedging-surfaces, and the other bar formed or provided with a projecting lug or detent, gripping devices adapted to ride on the wedging-surfaces of one of the bars, connections between said gripping devices and the other bar, a slide mounted on the bars and capable of travel thereon independently of the bars, said slide formed or provided with wedging-surfaces, a sleeve or other sliding member on the bars, connections between said sleeve or sliding member and the slide, means for causing the forward travel of the slide, means for causing the forward travel of the bars, and means for pulling rearwardly the bar carrying the detent.

3. In a traveler for pipes or conduits, the combination, of a longitudinal bar formed or provided at or near its forward end with cam or inclined surfaces, a toggle-joint, the links thereof carrying at their ends rollers which are adapted to work against the inclined or cam surfaces of the bar, a member carried by the bar and adapted to travel therewith but capable of having longitudinal movement on the bar independently of the movement of said bar, links connecting the toggle-joint with the member carried by the bar, a slide mounted on the bar and capable of travel thereon independently of the bar, said slide formed or provided with inclined or cam surfaces, a toggle-joint, the links thereof carrying at their ends rollers which are adapted to work against the inclined or cam surfaces of the slide, a sleeve or other sliding member on the bar, links connecting the last-referred-to toggle-joint with said sleeve or other sliding member, means for causing the forward travel of the slide, and means for causing the forward travel of the bar.

4. In a traveler for pipes or conduits, the combination, of a longitudinal bar formed or provided at or near its forward end with inclined or cam surfaces, a spring-controlled toggle-joint, the links thereof carrying at their ends rollers which are adapted to work against the inclined or cam surfaces of the bar, a member carried by the bar and adapted to travel therewith but capable of having longitudinal movement on the bar independently of the movement of said bar, links connecting the toggle-joint with the member carried by the bar, a slide mounted on the bar and capable of travel thereon independently of the bar, said slide formed or provided with inclined or cam surfaces, a spring-controlled toggle-joint, the links thereof carrying at their ends rollers which are adapted to work against the inclined or cam surfaces of the slide, a sleeve or other sliding member on the bar, links connecting the last-referred-to toggle-joint with said sleeve or other sliding part, means for causing the forward travel of the slide, and means for causing the forward travel of the bar.

5. In a traveler for pipes or conduits, the combination of longitudinal bars adapted to travel in a pipe or conduit, one of said bars formed or provided at or near its forward end with inclined or cam surfaces, and the other bar formed or provided with a projecting lug or detent, a toggle-joint, the links thereof carrying at their ends rollers which are adapted to work against the inclined or cam surfaces of the bar, other links connecting the toggle-joint links with the other bar, a slide mounted on the bars and capable of travel thereon independently of the bars, said slide formed or provided with inclined or cam surfaces, a toggle-joint, the links thereof carrying at their ends rollers which are adapted to work against the inclined or cam surfaces of the slide, a sleeve or other sliding member on the bars, links connecting the last-referred-to toggle-joint with said sleeve or sliding member, means for causing the forward travel of the slide, means for causing the forward travel of the bars, and means for pulling rearwardly the bar carrying the detent, the rearward pull of said bar acting first on the links connecting said bar with the links of the forward toggle-joint to thereby release the rollers of said toggle-joint from engagement with the sides of the conduit, and the further pulling of the releasing-bar causing the lug or detent thereof to contact with the sleeve, whereby a pull is exerted on said sleeve and on the links which are connected thereto and to the toggle-joint of the slide, whereby the rollers carried by said toggle-joint of the slide are also released from engagement with the sides of the conduit.

In testimony whereof I affix my signature in presence of two witnesses.

LOUIS C. KOHLER.

Witnesses:
A. L. MORSELL,
ANNA V. FAUST.